(12) United States Patent
Ho et al.

(10) Patent No.: US 9,923,635 B2
(45) Date of Patent: Mar. 20, 2018

(54) OPTICAL TRANSMITTER OR TRANSCEIVER INCLUDING REVERSED PLANAR LIGHTWAVE CIRCUIT (PLC) SPLITTER FOR OPTICAL MULTIPLEXING

(71) Applicant: Applied Optoelectronics, Inc., Sugar Land, TX (US)

(72) Inventors: I-Lung Ho, Sugar Land, TX (US); Hsiu-Che Wang, Rosenberg, TX (US); YongXuan Liang, Stafford, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/176,404

(22) Filed: Jun. 8, 2016

(65) Prior Publication Data

US 2017/0359126 A1 Dec. 14, 2017

(51) Int. Cl.
| | | |
|---|---|---|
| *H04B 10/2581* | (2013.01) | |
| *H04B 10/40* | (2013.01) | |
| *H04B 10/50* | (2013.01) | |
| *H04B 10/572* | (2013.01) | |
| *H04B 10/66* | (2013.01) | |

(Continued)

(52) U.S. Cl.
CPC .......... *H04B 10/40* (2013.01); *G02B 6/2938* (2013.01); *G02B 6/29397* (2013.01); *G02B 6/4208* (2013.01); *G02B 6/4246* (2013.01); *G02B 6/4249* (2013.01); *G02B 6/4292* (2013.01); *H04B 10/2581* (2013.01);

(Continued)

(58) Field of Classification Search
CPC .... H04B 10/40; H04B 10/503; H04B 10/572; H04B 10/66; H04B 10/2581; G02B 6/2938; G02B 6/29397; G02B 6/4208; G02B 6/4246; G02B 6/4249; G02B 6/4292
USPC ........................................................... 398/43
See application file for complete search history.

(56) References Cited

U.S. PATENT DOCUMENTS 6,278,813 B1 * 8/2001 Takada ............... G02B 6/12011
                                                385/24
9,143,261 B2 * 9/2015 Takahashi ............. H04B 10/40
(Continued)

FOREIGN PATENT DOCUMENTS

WO       2013034311 A1     3/2013

OTHER PUBLICATIONS

U.S. Office Action dated Mar. 31, 2017, received in U.S. Appl. No. 15/176,382, 11 pgs.

(Continued)

*Primary Examiner* — Dalzid Singh
(74) *Attorney, Agent, or Firm* — Grossman Tucker Perreault & Pfleger, PLLC; Norman S. Kinsella

(57) ABSTRACT

A multi-channel optical transmitter or transceiver uses a reversed planar lightwave circuit (PLC) splitter as an optical multiplexer to combine optical signals at different channel wavelengths into a multiplexed optical signal. The reversed PLC splitter includes splitter output ports that are used as the mux input ports and a splitter input port that is used as the mux output port. The mux input ports may be optically coupled to respective transmitter optical subassembly (TOSA) modules with or without optical fibers. The PLC splitter includes wavelength independent branched waveguides that combine the optical signals received on the mux input ports into the multiplexed optical signal on the mux output port.

20 Claims, 3 Drawing Sheets

(51) Int. Cl.
  *G02B 6/293* (2006.01)
  *G02B 6/42* (2006.01)
(52) U.S. Cl.
  CPC ......... *H04B 10/503* (2013.01); *H04B 10/572* (2013.01); *H04B 10/66* (2013.01)

(56) References Cited

U.S. PATENT DOCUMENTS

| | | | |
|---|---|---|---|
| 2003/0223709 A1 | 12/2003 | Lake et al. | |
| 2006/0013541 A1* | 1/2006 | Plickert | G02B 6/4246 385/89 |
| 2006/0022213 A1* | 2/2006 | Posamentier | H01S 5/02212 257/99 |
| 2009/0073582 A1* | 3/2009 | Lee | G02B 7/021 359/819 |
| 2011/0033192 A1 | 2/2011 | Daiber et al. | |
| 2011/0058771 A1* | 3/2011 | Lee | G02B 6/4215 385/33 |
| 2012/0251056 A1 | 10/2012 | Tanaka et al. | |
| 2013/0039662 A1* | 2/2013 | Brooks | G02B 6/12007 398/91 |
| 2013/0121651 A1 | 5/2013 | Takahashi et al. | |
| 2013/0195441 A1 | 8/2013 | Lee et al. | |
| 2013/0287407 A1 | 10/2013 | Pan et al. | |
| 2014/0346323 A1* | 11/2014 | Fujimura | G01J 1/44 250/208.2 |
| 2015/0318952 A1 | 11/2015 | Butrie et al. | |
| 2016/0050019 A1* | 2/2016 | Gothoskar | H04B 10/40 398/135 |
| 2016/0147017 A1 | 5/2016 | Tamura | |
| 2017/0059796 A1* | 3/2017 | Huang | G02B 6/4251 |

OTHER PUBLICATIONS

EP Search Report dated Nov. 7, 2017, received in EP Application Serial No. 17174985.6, 8 pgs.

* cited by examiner

OPTICAL TRANSMITTER OR TRANSCEIVER INCLUDING REVERSED PLANAR LIGHTWAVE CIRCUIT (PLC) SPLITTER FOR OPTICAL MULTIPLEXING

TECHNICAL FIELD

The present disclosure relates to optical transmitters and transceivers, and more particularly, to an optical transmitter or transceiver including a reversed planar lightwave circuit (PLC) splitter for optical multiplexing.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver.

BRIEF DESCRIPTION OF THE DRAWINGS

These and other features and advantages will be better understood by reading the following detailed description, taken together with the drawings wherein.

DETAILED DESCRIPTION

Figure 1:
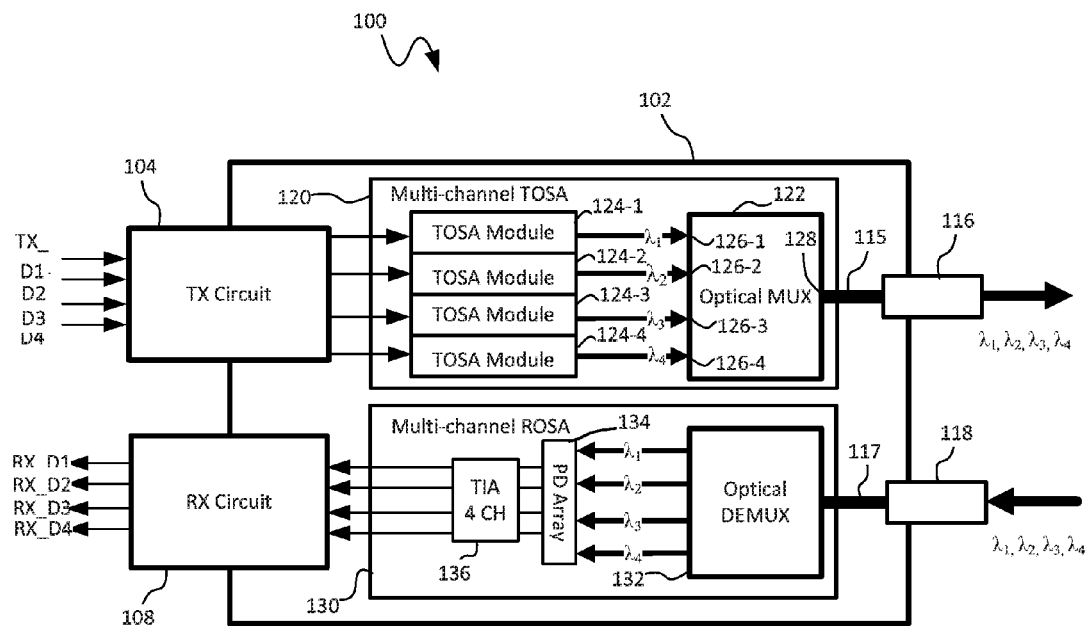
FIG. 1 is a schematic diagram of a multi-channel optical transceiver including a multi-channel transmitter optical sub-assembly (TOSA) and multi-channel receiver optical sub-assembly (ROSA), consistent with embodiments of the present disclosure.

A multi-channel optical transmitter or transceiver, consistent with the present disclosure, uses a reversed planar lightwave circuit (PLC) splitter as an optical multiplexer to combine optical signals at different channel wavelengths into a multiplexed optical signal. The reversed PLC splitter includes splitter output ports that are used as the mux input ports and a splitter input port that is used as the mux output port. The mux input ports may be optically coupled to respective transmitter optical subassembly (TOSA) modules with or without optical fibers. The PLC splitter includes wavelength independent branched waveguides that combine the optical signals received on the mux input ports into the multiplexed optical signal on the mux output port.

Because the PLC splitter is wavelength independent (i.e., the waveguides do not correspond to a particular wavelength), the PLC splitter may be less susceptible to wavelength drift, for example, caused by temperature changes. In an arrayed waveguide grating (AWG), each of the waveguides is designed to pass a particular wavelength and thus the input ports are matched to lasers emitting those wavelengths when using the AWG for optical multiplexing. As such, insertion loss of the AWG is also wavelength dependent because changes in the laser wavelengths (i.e., drift) from the corresponding wavelengths of the AWG inputs will result in changes of insertion loss. The final output power of the AWG may thus vary with temperature and may vary differently across different channels. Also, the input ports of the AWG can only be connected to corresponding TOSA modules with the matching channel wavelength. Although the PLC splitter may have higher insertion loss than an AWG, the insertion loss is less likely to vary with temperature and is more consistent across channels, thereby providing improved channel-to-channel power stability. Using the reversed PLC splitter instead of an AWG may also provide more connectivity flexibility when optically coupling in a transmitter or transceiver.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another without the use of an intermediate device such as a fiber. As used herein, "directly aligned" refers to an alignment between optical components that allows light to pass from one optical component to another optical component without changing the linear path of the light, for example, without using an optical fiber.

Referring to FIG. 1, an optical transceiver 100, consistent with embodiments of the present disclosure, is shown and described. In this embodiment, the optical transceiver 100 transmits and receives four (4) channels using four different channel wavelengths ($\lambda_1$, $\lambda_2$, $\lambda_3$, $\lambda_4$) and may be configured for coarse wavelength division multiplexing (CWDM), although other numbers of channels are possible and within the scope of this disclosure. In one example, the channel wavelengths $\lambda_1$, $\lambda_2$, $\lambda_3$, $\lambda_4$ may be about 1270 nm, 1290 nm, 1310 nm, and 1330 nm, respectively. The optical transceiver 100 may be capable of transmission rates of at least about 25 Gbps per channel. The optical transceiver 100 may also be capable of both short transmission distances of tens of meters, for example, to distances of 2 kilometers or more. The optical transceiver 100 may be used, for example, in internet data center applications or fiber to the home (FTTH) applications.

In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+transceivers.

The optical transceiver 100 includes a multi-channel transmitter optical subassembly (TOSA) 120 for transmitting optical signals on the channel wavelengths (e.g., $\lambda_1$, $\lambda_2$, $\lambda_3$, $\lambda_4$) and a multi-channel receiver optical subassembly (ROSA) 130 for receiving optical signals on the channel wavelengths (e.g., $\lambda_1$, $\lambda_2$, $\lambda_3$, $\lambda_4$). The multi-channel TOSA 120 and the multi-channel ROSA 130 are located in a transceiver housing 102. A transmit connecting circuit 104 and a receive connecting circuit 108 provide electrical connections to the multi-channel TOSA 120 and the multi-channel ROSA 130, respectively, within the housing 102. The transmit connecting circuit 104 is electrically connected to the electronic components (e.g., the lasers, monitor photodiodes, etc.) in the multi-channel TOSA 120 and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry. The transmit connecting circuit 104 and the receive connecting circuit 108 may communicate with external systems via a data bus, such as a 38-pin connector that comports with physical connector QSFP standards and data communication protocols.

In this embodiment, the TOSA 120 includes a plurality of TOSA modules 124-1 to 124-4 optically coupled to an optical multiplexer 122 including a reversed PLC-splitter, as described in greater detail below. The reversed PLC-splitter optical multiplexer 122 includes mux input ports 122-1 to 122-4 and a mux output port 128. The TOSA modules 124-1 to 124-4 may be coupled to the mux input ports 122-1 to 122-4 of the optical multiplexer 122 with or without using optical fibers, as described in greater detail below. The TOSA modules 124-1 to 124-4 generate optical signals at different respective channel wavelengths (e.g., $\lambda_1$, $\lambda_2$, $\lambda_3$, $\lambda_4$) and the optical multiplexer 122 combines or multiplexes those optical signals to provide a multiplexed optical signal on the mux output port 128 coupled to an output optical fiber 115. The output optical fiber 115 is coupled to an output optical connector 116, such as an LC connector.

Each of the TOSA modules 124-1 to 124-4 may have a coaxial configuration such that the TOSA module is electrically connected at one end to conductive paths on the transmit connecting circuit 104 and optically coupled at the other end. Each of the TOSA modules 124-1 to 124-4 may include a laser for generating laser light at the assigned channel wavelength and optics for coupling the laser light into the respective mux input ports 126-1 to 126-4 of the optical multiplexer 122. The lasers in the TOSA modules 124-1 to 124-4 thus convert electrical data signals (TX_D1 to TX_D4) received via the transmit connecting circuit 104 into modulated optical signals coupled into the optical multiplexer 122. The lasers may include, for example, distributed feedback (DFB) lasers with diffraction gratings. Each of the TOSA modules 124-1 to 124-4 may also include a monitor photodiode for monitoring the light emitted by the lasers.

Each of the TOSA modules 124-1 to 124-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA 130 includes an optical demultiplexer 132 coupled to a photodetector array 134 including, for example, photodiodes. The optical demultiplexer 132 demultiplexes or separates a multiplexed optical signal received on an input optical fiber 117 to provide received optical signals at different channel wavelengths, which are detected by respective photodetectors in the photodetector array 134. The input optical fiber 117 is coupled to an input optical connector 118, such as an LC connector. The multi-channel ROSA 130 also includes a multi-channel transimpedance amplifier 136 electrically connected to the photodetector array 134. The photodetector array 134 and the transimpedance amplifier 136 detect and convert optical signals received from the optical demultiplexer 132 into electrical data signals (RX_D1 to RX_D4) that are output via the receive connecting circuit 108. Although one example of the multi-channel ROSA 130 is described, the optical transceivers 100 may include other types or embodiments of ROSAs.

Figure 2:
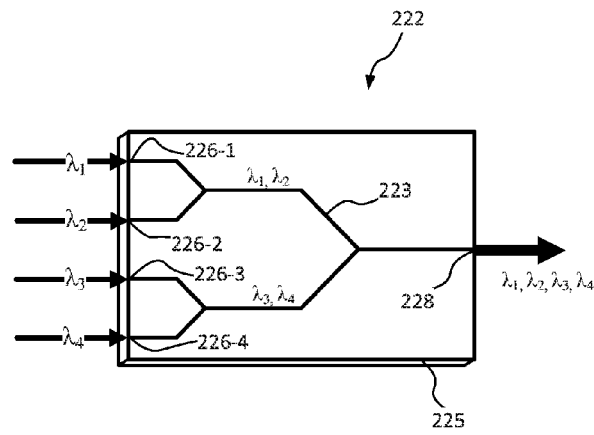
FIG. 2 is a schematic diagram of a reversed planar lightwave circuit (PLC) splitter, which may be used as an optical multiplexer in the multi-channel optical transceiver shown in FIG. 1.

FIG. 2 shows a schematic diagram of a reversed PLC splitter 222, which may be used as the optical multiplexer 122 in the transceiver shown in FIG. 1. The reversed PLC splitter 222 includes splitter output ports 226-1 to 226-4, which are used as mux input ports, and a splitter input port 228, which is used as a mux output port. In the example embodiment, the PLC splitter 222 is a 1:4 splitter having 4 splitter output ports 226-1 to 226-4 providing 4 mux input ports and 1 splitter input port 228 providing 1 mux output port. Other PLC splitter configurations are also within the scope of the present disclosure.

A plurality of branched waveguides 223 are embedded in a PLC substrate 225 and extend from the splitter input port 228 to the splitter output ports 226-1 to 226-4. In one example, the PLC substrate 225 may be silica glass with the branched waveguides 223 being formed therein using lithography techniques. The branched waveguides 223 pass a range of wavelengths and thus the waveguides 223 and the ports 226-1 to 226-4 are wavelength independent. When the PLC splitter 222 is reversed and light is coupled into the splitter output ports 226-1 to 226-4, the light is combined at the branch junctions and the combined light is output from the splitter input port 228. In other words, optical signals at different channel wavelengths (e.g., $\lambda_1$, $\lambda_2$, $\lambda_3$, $\lambda_4$) may be coupled into the respective ports 226-1 to 226-4 and a multiplexed optical signal combining the channel wavelengths is output from the port 228. An isolator (not shown) may be used in the light path of each channel to reduce cross talk between channels when the wavelengths are combined. In some embodiments, an isolator may be located in each TOSA module, as will be described in greater detail below. In other embodiments, isolators may be located between ends of optical fibers and the ports 226-1 to 226-4.

The reversed PLC splitter 222 may be designed to have the same form factor as an AWG and thus may easily be substituted into existing optical transceivers or transmitters that use an AWG as an optical multiplexer. The reversed PLC splitter 222 may have a higher insertion loss than an AWG, but the insertion loss is less likely to change across different channels as a result of wavelength drift. Also, the higher insertion loss may be compensated with higher power output from the TOSA modules. In one example, the insertion loss of a reversed 1:4 PLC splitter 222 used as an optical multiplexer may be in the range of about 7 dB and the power output of each of the TOSA modules may be increased by about 2 dB to compensate.

Figure 3:
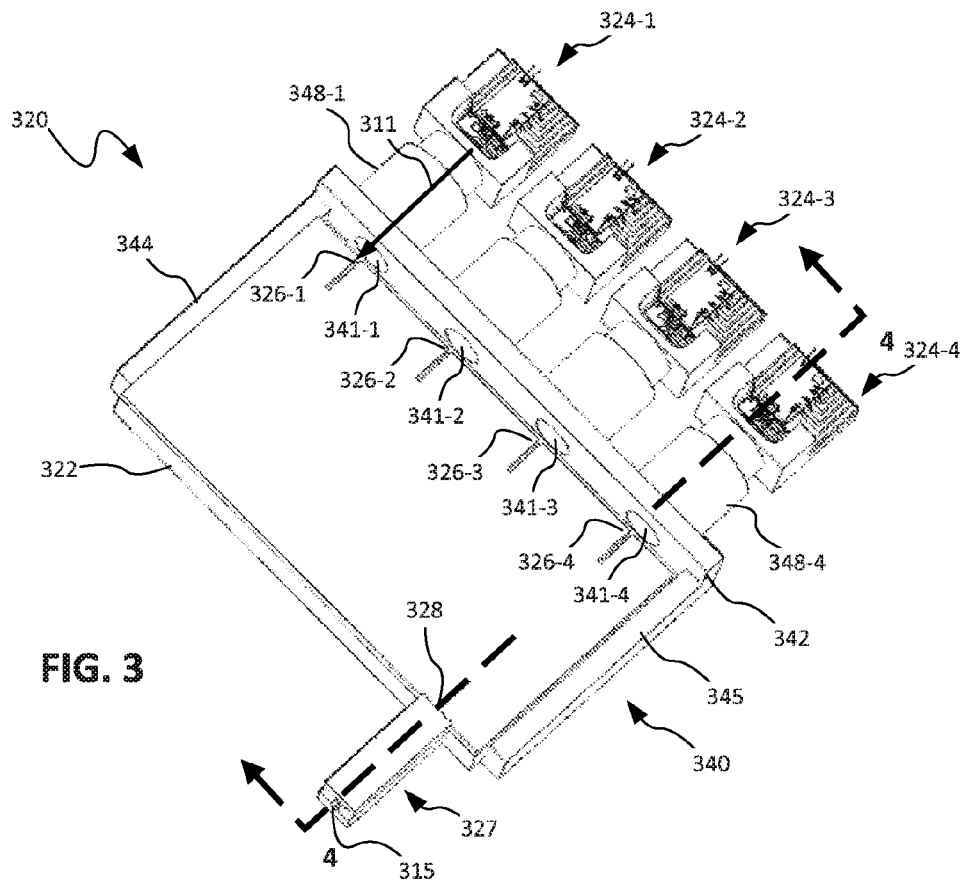
FIG. 3 is a perspective view of an embodiment of a multi-channel optical transmitter including TOSA modules directly aligned with a reversed PLC splitter used as an optical multiplexer, consistent with the present disclosure.
Figure 4:
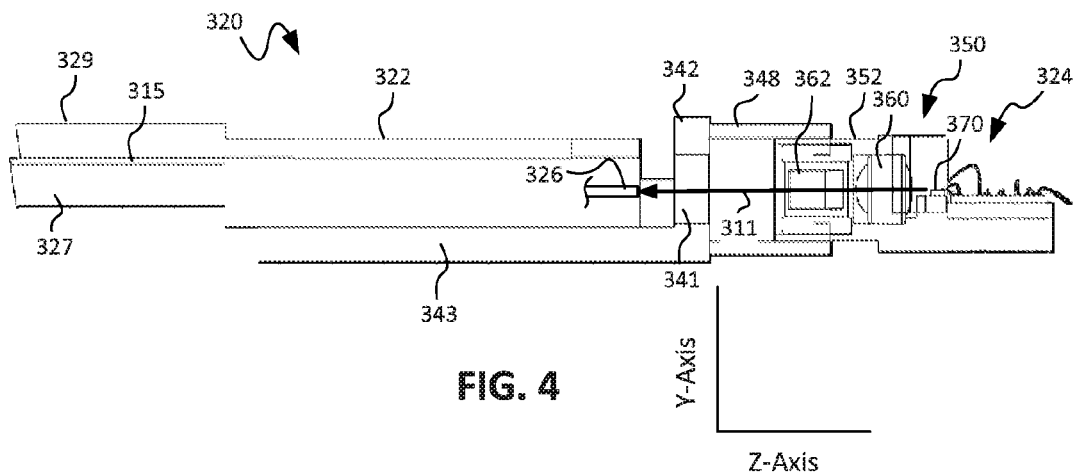
FIG. 4 is a cross-sectional side view of the multi-channel optical transmitter shown in FIG. 3.

Referring to FIGS. 3 and 4, an embodiment of a multi-channel transmitter 320 may include a plurality of TOSA modules 324-1 to 324-4 optically coupled to and directly aligned with mux input ports 326-1 to 326-4 of a reversed PLC splitter 322. The multi-channel optical transmitter 320 may be used as the TOSA 120 in the multi-channel transceiver 100 shown in FIG. 1 or may be used separately as a transmitter. Although four (4) TOSA modules 324-1 to 324-4 are shown to support four (4) channels, other numbers of TOSA modules and channels are within the scope of the present disclosure.

In this embodiment, the multi-channel optical transmitter 320 includes a multiplexer housing 340 receiving the reversed PLC splitter 322 and the TOSA modules 324-1 to 324-4 are mounted to the multiplexer housing 340. The multiplexer housing 340 includes at least one side wall 342 and a plurality of input apertures 341-1 to 341-4 through the side wall 342 and aligned with the mux input ports 326-1 to 326-4 of the reversed PLC splitter 322. The TOSA modules 324-1 to 324-4 are optically coupled to and directly aligned with the respective mux input ports 326-1 to 326-4 through the respective input apertures 341-1 to 341-4 in the side wall 342.

When directly aligned, as shown in FIG. 4, a laser output 311 from a TOSA module 324 passes into the mux input port 326 without using an optical fiber or other optical component to change the path of the laser output 311. The reversed PLC splitter 322 is designed such that the mux input ports 326-1 to 326-4 are spaced sufficiently to allow the multiple TOSA modules 324-1 to 324-4 to be mounted side-by-side on the side wall 342 and directly aligned with the mux input ports 326-1 to 326-4. The input apertures 341-1 to 341-4 may thus have the same spacing, center-to-center, to align with the mux input ports 326-1 to 326-4. In one example, the mux input ports 326-1 to 326-4 may be spaced about 3.25 mm.

In the illustrated embodiment, Z-rings 348-1 to 348-4 are used to mount the TOSA modules 324-1 to 324-4 to the side wall 342 of the multiplexer housing 340 and to facilitate alignment of the laser output from the TOSA modules 324-1 to 324-4 with the mux input ports 326-1 to 326-4 on the reversed PLC splitter 322. As shown in FIG. 4 and described in greater detail below, each TOSA module 324 includes a TOSA base 350 having an optical coupling end 352 that is received inside and secured to a respective Z-ring 348. In the illustrated embodiment, the optical coupling end 352 of the TOSA base 350 is cylindrical shaped and is received in a cylindrical aperture in the Z-ring 348, although other shapes are within the scope of the present disclosure. The Z-ring 348 may be made of a metal material such as stainless steel.

Before the Z-ring 348 is secured to the optical coupling end 352 of the TOSA base 350, the TOSA module 324 may be aligned along the Z axis relative to the mux input port 326. Once aligned along the Z-axis, the Z-ring 348 may be secured, in the aligned position, to the optical coupling end 352, for example, by laser welding with a YAG laser or other suitable laser. The TOSA module 324 with the attached Z-ring 348, already aligned in the Z-axis, may then be aligned along the X-Y axes relative to the mux input port 326. Once aligned along the X-Y axes, the Z-ring 348 may be secured to the side wall 341, for example, using laser welding with a YAG laser or other suitable laser. Laser welding allows the TOSA module 324 to be re-aligned or re-hammered later, if necessary, by softening the weld with the laser and adjusting the coupling position to the desired power.

Alignment may be performed, for example, by measuring the power of light coupled into the reversed PLC splitter 322 and determining a position of the TOSA module 224 relative to the reversed PLC splitter 322 that provides maximum or relative maximum power. The coupled laser light may be measured, for example, from a mux output port 328 of the optical multiplexer 322 while moving the TOSA module 324 in the Z and/or X-Y directions as described above.

An output optical fiber 315 may be optically coupled to and aligned with the mux output port 328, for example, using a fiber holder including a first block 327 including a V-shaped groove for receiving the optical fiber 315 and a second block 329 used to hold the optical fiber 315 in the V-shaped groove in the first block 327. The output optical fiber 315 may also be coupled to the mux output port 328 using other structures and/or techniques.

The multiplexer housing 340 may be made of a metal material, such as stainless steel, which is similar to the material of the Z-rings 348 to facilitate welding. In the example embodiment, the multiplexer housing 340 includes a base 343 and end walls 344, 345 on each end of the side wall 342 (see FIGS. 3 and 4). The end walls 344, 345 may be spaced to receive the reversed PLC splitter 322 and align the mux input ports 326-1 to 326-1 with the respective input apertures 341 in the side wall 342. The multiplexer housing 340 may be open on an opposite side or at least include a space sufficient to allow the output optical fiber 315 to be directly coupled to the mux output port 328. Other configurations of the multiplexer housing 340 are also within the scope of the present disclosure.

Figure 5:
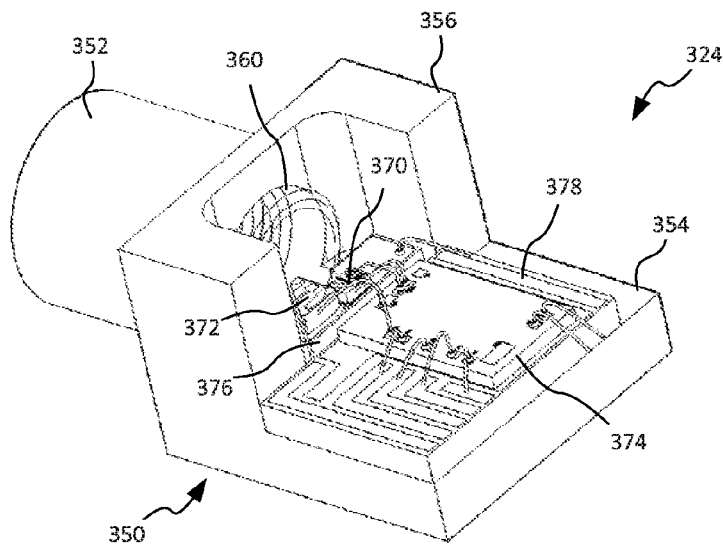
FIG. 5 is a perspective view of a TOSA module used in the multi-channel transmitter shown in FIG. 3, consistent with embodiments of the present disclosure.

FIG. 5 shows an embodiment of the TOSA module 324 in greater detail. The TOSA base 350 includes an electrical coupling end 354 opposite the optical coupling end 352 and walls 356 between the optical coupling end 352 and the electrical coupling end 354. In this embodiment, the TOSA module 324 includes a lens 360 and an isolator 362 (see FIG. 4) located in the optical coupling end 352 and a laser diode 370, monitor photodiode 372, and laser driver circuitry 374 supported on the electrical coupling end 354 of the TOSA base 350. The isolator 362 is located inside the optical coupling end 352 and the lens 360 is located in an opening to the optical coupling end 352 such that light output from the laser diode 370 is focused by the lens 360 through the isolator 362 and through the input aperture 341 to the mux input port 326 (see FIG. 4). The laser diode 370 and the monitor photodiode 372 are mounted on a diode submount 376 and the laser driver circuitry 374 is mounted on a laser driver submount 378 including conductive paths for providing electrical connections. Other TOSA modules having different configurations may also be optically coupled to the reversed PLC splitter consistent with the present disclosure.

Figure 6:
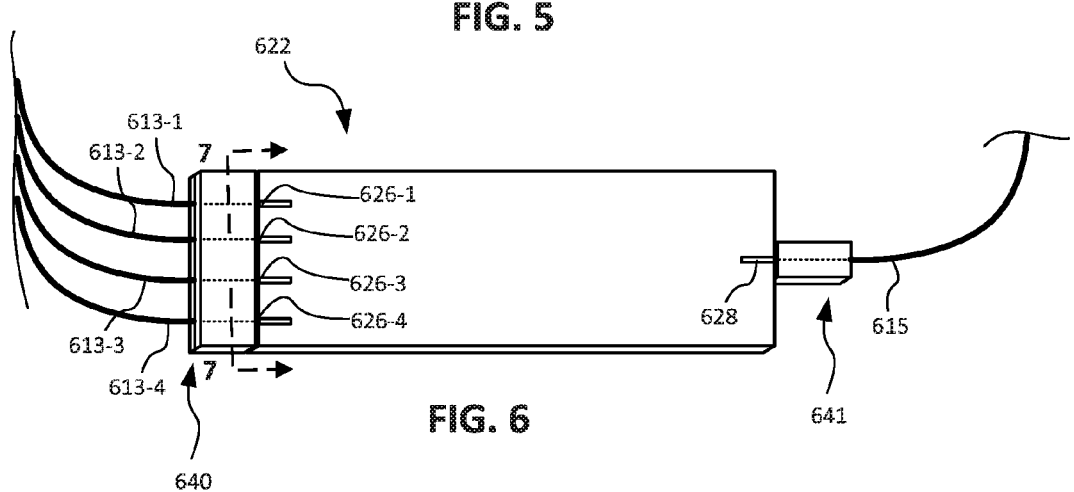
FIG. 6 is a top perspective view of an optical fiber array optically coupled to a reversed PLC splitter used as an optical multiplexer, consistent with another embodiment the present disclosure.
Figure 7:
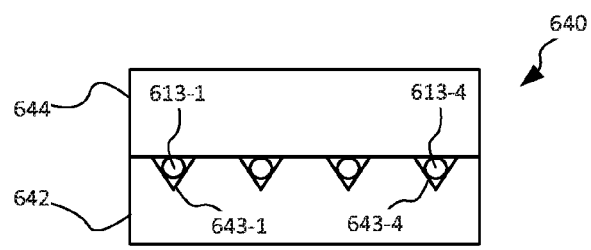
FIG. 7 is a cross-sectional view of the fiber array holder in FIG. 6 taken along line 7-7.

Referring to FIGS. 6 and 7, a reversed PLC splitter 622 may also be optically coupled to TOSA modules (not shown) using an array of input optical fibers 613-1 to 613-4. The input optical fibers 613-1 to 613-4 may be optically coupled at one end to respective mux input ports 626-1 to 626-4 of the reversed PLC splitter 622 and optically coupled at an opposite end to respective TOSA modules (not shown). An output optical fiber 615 is optically coupled to a mux output port 628 of the reversed PLC splitter 622. This embodiment of a reversed PLC splitter 622 may also be used in a multi-channel optical transmitter or transceiver.

In this embodiment, the array of input optical fibers 613-1 to 613-4 are optically coupled with and aligned to the mux input ports 626-1 to 626-4 using a fiber array holder 640 and the output optical fiber 615 is optically coupled with and aligned to the mux output port 628 with an output fiber holder 641. As shown in FIG. 7, the fiber array holder 640 includes a first block 642 including V-shaped grooves 643-1 to 643-4 receiving the input optical fibers 613-1 to 613-4 and a second block 644 holding the input optical fibers 613-1 to 613-4 in the V-shaped grooves 643-1 to 643-4. The output fiber holder 641 may have a similar structure including first and second blocks and a V-shaped groove for holding the output optical fiber 615. The optical fibers may also be optically coupled using other structures and/or techniques.

Accordingly, a multi-channel optical transmitter or transceiver may use a reversed PLC splitter as an optical multiplexer (e.g., instead of an AWG) to reduce changes in insertion loss across channels and to improve channel-to-channel stability.

Consistent with one embodiment, multi-channel optical transceiver includes a transceiver housing, a plurality of transmitter optical subassembly (TOSA) modules for transmitting a plurality of optical signals at different respective channel wavelengths, and an optical multiplexer for multiplexing the plurality of optical signals into a multiplexed optical signal including the different channel wavelengths. The optical multiplexer includes a plurality of mux input ports optically coupled to the respective TOSAs for receiving the respective optical signals and a mux output port for outputting the multiplexed optical signal. The optical multiplexer is a reversed planar lightwave circuit (PLC) splitter including a plurality of splitter output ports used as the mux input ports, a splitter input port used as the mux output port and wavelength independent branched waveguides configured to combine the optical signals into the multiplexed optical signal. The multi-channel optical transceiver also includes a multi-channel receiver optical subassembly (ROSA) for receiving a multiplexed optical signal including multiple channel wavelengths, separating the channel wavelengths, and detecting optical signals at each of the channel wavelengths.

Consistent with another embodiment, a multi-channel optical transmitter includes a multiplexer housing and an optical multiplexer located in the multiplexer housing for multiplexing a plurality of optical signals into a multiplexed optical signal including the different channel wavelengths. The optical multiplexer includes a plurality of mux input ports for receiving the respective optical signals and a mux output port for outputting the multiplexed optical signal. The optical multiplexer is a reversed planar lightwave circuit (PLC) splitter including a plurality of splitter output ports used as the mux input ports, a splitter input port used as the mux output port and wavelength independent branched waveguides configured to combine the optical signals into the multiplexed optical signal. The multi-channel optical transmitter also includes a plurality of transmitter optical subassembly (TOSA) modules optically coupled to and directly aligned with the mux input ports without using optical fibers, the TOSA modules being configured to transmit a plurality of optical signals at different channel wavelengths.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A multi-channel optical transceiver comprising:
   a transceiver housing;
   a plurality of transmitter optical subassembly (TOSA) modules for transmitting a plurality of optical signals at different respective channel wavelengths;
   an optical multiplexer for multiplexing the plurality of optical signals into a multiplexed optical signal including the different channel wavelengths, the optical multiplexer including a plurality of mux input ports optically coupled to the respective TOSAs for receiving the respective optical signals and a mux output port for outputting the multiplexed optical signal, the optical multiplexer including a reversed planar lightwave circuit (PLC) splitter including a plurality of splitter output ports used as the mux input ports, a splitter input port used as the mux output port and wavelength independent branched waveguides configured to combine the optical signals into the multiplexed optical signal; and
   a multi-channel receiver optical subassembly (ROSA) for receiving a multiplexed optical signal including multiple channel wavelengths, separating the channel wavelengths, and detecting optical signals at each of the channel wavelengths.

2. The multi-channel optical transceiver of claim 1, wherein the TOSA modules are directly aligned with the mux input ports.

3. The multi-channel optical transceiver of claim 1, further comprising an array of optical fibers optically coupling the TOSA modules to the mux input ports.

4. The multi-channel optical transceiver of claim 1, further including optical isolators optically coupled to the mux input ports for isolating the optical signals received on the mux input ports.

5. The multi-channel optical transceiver of claim 1, wherein each of the TOSA modules includes a TOSA base, a laser diode supported on the base, laser driving circuitry supported on the base for driving the laser diode, and a lens supported on the base and aligned with the laser diode for optically coupling laser light.

6. The multi-channel optical transceiver of claim 1, wherein each of the TOSA modules further includes an isolator for isolating laser light from the lens.

7. The multi-channel optical transceiver of claim 1, wherein the PLC splitter is a 1:4 splitter providing 4 mux input ports and 1 mux output port.

8. The multi-channel optical transceiver of claim 1, wherein the channel wavelengths include wavelengths of about 1270 nm, 1290 nm, 1310 nm, and 1330 nm.

9. The multi-channel optical transceiver of claim 1, wherein the transceiver is a Small Form-factor Pluggable (SFP) transceiver module.

10. The multi-channel optical transceiver of claim 9, wherein the TOSA modules include four (4) TOSA modules each configured to transmit an optical signal at a transmission rate of at least about 25 Gbps, and wherein the PLC splitter is a 1:4 splitter providing 4 mux input ports and 1 mux output port.

11. The multi-channel optical transceiver of claim 1, wherein the TOSA modules include four (4) TOSA modules each configured to transmit an optical signal at a transmission rate of at least about 25 Gbps, and wherein the PLC splitter is a 1:4 splitter providing 4 mux input ports and 1 mux output port.

12. A multi-channel optical transmitter comprising:
a multiplexer housing;
an optical multiplexer located in the multiplexer housing for multiplexing a plurality of optical signals into a multiplexed optical signal including the different channel wavelengths, the optical multiplexer including a plurality of mux input ports for receiving the respective optical signals and a mux output port for outputting the multiplexed optical signal, the optical multiplexer including a reversed planar lightwave circuit (PLC) splitter including a plurality of splitter output ports used as the mux input ports, a splitter input port used as the mux output port and wavelength independent branched waveguides configured to combine the optical signals into the multiplexed optical signal; and
a plurality of transmitter optical subassembly (TOSA) modules optically coupled to and directly aligned with the mux input ports without using optical fibers, the TOSA modules being configured to transmit a plurality of optical signals at different channel wavelengths.

13. The multi-channel optical transmitter of claim 12, wherein each of the TOSA modules includes a TOSA base, a laser diode supported on the base, laser driving circuitry supported on the base for driving the laser diode, and a lens supported on the base and aligned with the laser diode for optically coupling laser light.

14. The multi-channel optical transmitter of claim 13, further including isolators optically coupled between the lenses and the mux input ports, respectively, for isolating laser light.

15. The multi-channel optical transmitter of claim 13, wherein the TOSA base of each of the TOSA modules includes an optical coupling end optically coupled to the mux input and an electrical coupling end for providing electrical connections, wherein the optical coupling end defines an aperture aligned with the lens and the laser diode, and wherein the electrical coupling end supports the laser driving circuitry.

16. The multi-channel optical transmitter of claim 15, further including an isolator located in the aperture of the optical coupling end of the TOSA base of each of the TOSA modules.

17. The multi-channel optical transmitter of claim 12, wherein the PLC splitter is a 1:4 splitter providing 4 mux input ports and 1 mux output port.

18. The multi-channel optical transmitter of claim 12, wherein the TOSA modules include four (4) TOSA modules each configured to transmit an optical signal at a transmission rate of at least about 25 Gbps, and wherein the PLC splitter is a 1:4 splitter providing 4 mux input ports and 1 mux output port.

19. The multi-channel optical transmitter of claim 12, wherein the multiplexer housing includes at least one side wall with input apertures, and wherein the mux input ports are aligned with the input apertures and the TOSA modules are mounted to the side wall and aligned with the input apertures.

20. The multi-channel optical transmitter of claim 19, further comprising Z-rings mounting each of the TOSA modules to the side wall.

* * * * *